Oct. 5, 1965  E. C. FEINE  3,210,229
LIQUID FUEL FILTER
Filed June 30, 1961  3 Sheets-Sheet 1

INVENTOR.
Ernest C. Feine,
BY
Beau, Brooks, Buckley & Beau

Oct. 5, 1965 E. C. FEINE 3,210,229
LIQUID FUEL FILTER
Filed June 30, 1961
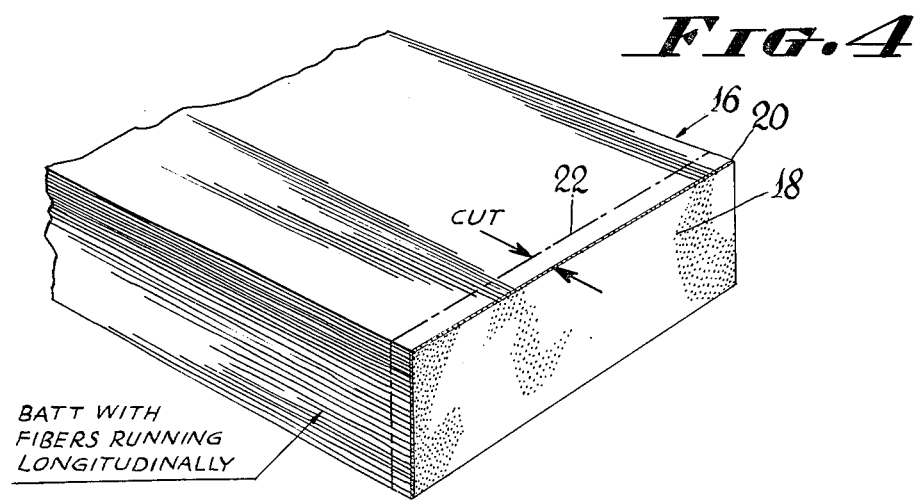
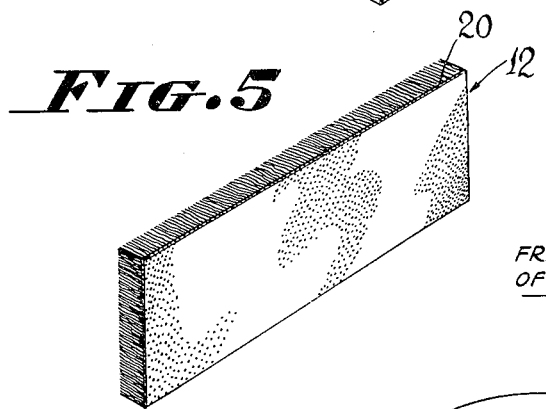
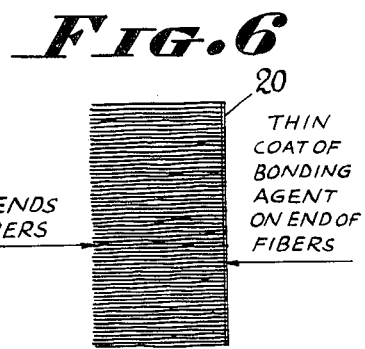
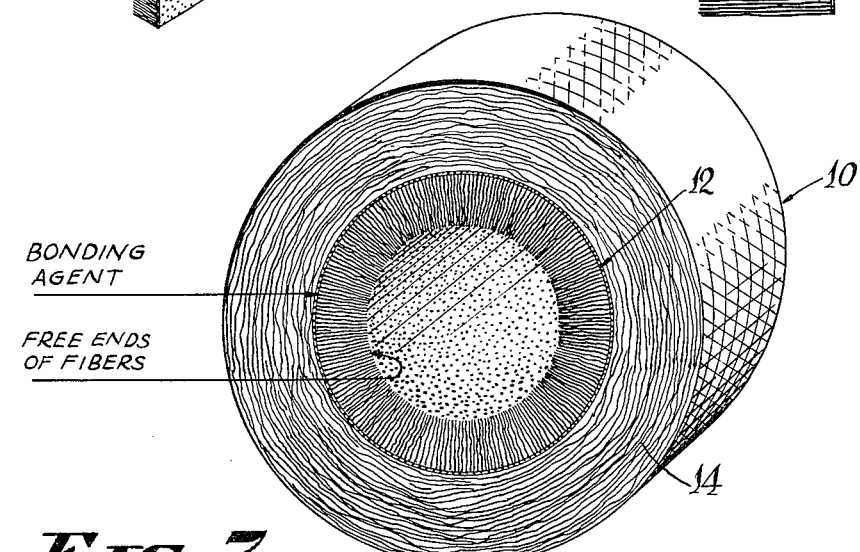

Oct. 5, 1965  E. C. FEINE  3,210,229
LIQUID FUEL FILTER
Filed June 30, 1961  3 Sheets-Sheet 3
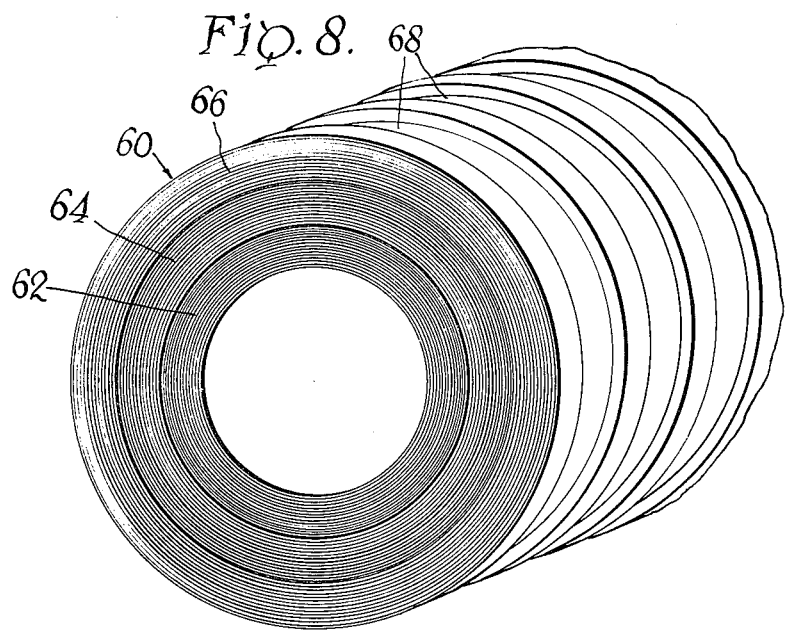
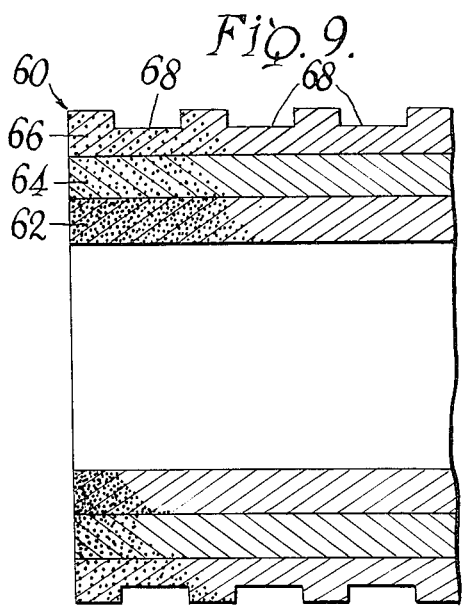
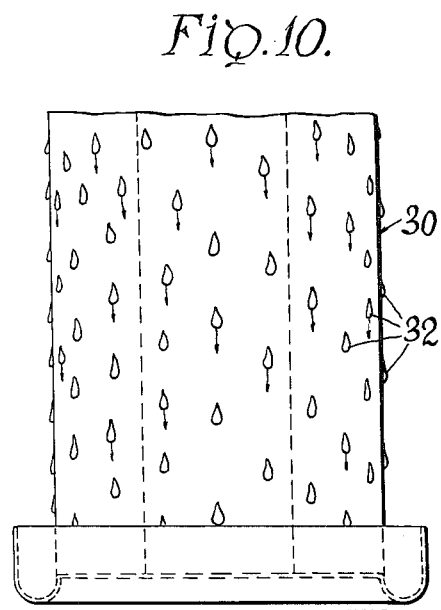
INVENTOR.
Ernest C. Feine,
BY
Bean, Brooks, Buckley + Bean.
ATTORNEYS.

United States Patent Office 3,210,229
Patented Oct. 5, 1965

3,210,229
LIQUID FUEL FILTER
Ernest C. Feine, Snyder, N.Y., assignor, by mesne assignments, to Bowser, Inc., Fort Wayne, Ind.
Filed June 30, 1961, Ser. No. 121,011
3 Claims. (Cl. 156—213)

This invention relates to filters for liquids and the method for making them and pertains more particularly, to certain improvements wherein the more exacting requirements of present day liquid filtering problems are met.

The problems involved in filtering liquids are becoming more and more involved and difficult because of the requirements for more highly effective and efficient filtering elements. For example, manufacturers of internal combustion engines are becoming more and more demanding in filtering requirements for lubricating oils thereof as the importance of filtering the lubricant is better appreciated as effecting such factors as reduction of wear and economy of operation. Whereas it was not long ago that relatively inefficient filters as for example the well known by-pass type filter, were considered adequate for the lubricating oils for internal combustion engines, internal combustion engine designers are requiring full flow lubricating oil filters to be used almost universally.

The need for full flow filters increases the importance of eliminating the ever present danger of full or partial clogging of the filter element to such degree that insufficient lubricating oil will pass through the filter to adequately lubricate the working parts of the engine. For this reason, by-pass valves are normally associated with such types of filters. However, the by-pass valves themselves are not always assured of proper operation and engine failures do occur due to insufficient lubrication from the effects as above noted.

Still further, designers of internal combustion engines are also requiring some measure of water separation from the lubricating oil inasmuch as the presence of water in the lubricating oil gives rise to the formation of corrosive acids which readily attack the component parts of the engine, notably the bearings thereof. This water may appear in the form of discrete droplet but will more usually occur in the form of an emulsion and prior art filtering elements of conventional and economical design do not satisfactorily break such emulsions and remove water from the oil.

As a further example of problems arising in the liquid filtering field in accordance with present practice, it may be mentioned that the filtering of liquid hydrocarbon fuels particularly as are used for jet engines, require very exacting conditions to be met. First of all, the removal of solid impurities down to very small particle size is absolutely necessary, and it is also necessary to remove not only entrained water but also water appearing in the form of emulsions and this removal must be effected to such a degree that substantially no water in any form remains.

Therefore, present day filtering systems should preferably, and in some cases must, meet the following requirements:

(1) Removal of solid impurities down to very small particle size.
(2) Removal of entrained water.
(3) Removal of water in the form of emulsion.
(4) Relative freedom from clogging.
(5) Achievement of the above objectives in an economical manner.

It is therefore of primary concern in connection with the present invention to provide an improved method of making a filter element which will meet all of the above requirements.

More specifically, the present invention relates to an improved method of making a filter element in accordance with the preceeding object wherein the mass of filtering material first encountered by the liquid to be filtered is relatively porous and of low density to permit deep penetration of the fluid together with at least a major portion of the solid impurities carried thereby into such materials and wherein other regions or masses of the filtering medium downstream of the liquid flow are of less porosity and greater density to thereby filter out the solid impurities down to very small particle size and to also effect the removal of entrained water and the breaking down of emulsions to separate the emulsified water into discrete droplets for ultimate disposition in isolation to the main body of filtered liquid.

Another object of this invention resides in the provision of an improved filtering element wherein the liquid being filtered is allowed to penetrate relatively deeply into the initially encountered mass of filtering medium as it flows through the filter element so that the removal of solid impurities is not restricted to any one given or clearly definable zone within the filtering medium as, for example, at or near the surface of the filtering medium which is the case for conventional filtering elements. In this fashion, the present invention substantially obviates the possibility of rapid or premature clogging of the filtering element and therefore permits the same to operate over a long period of time in full flow fashion without the necessity for attendant safety devices such as by-pass valves.

More specifically, another object of the invention is to provide an improved method of making a filtering element wherein the filtering medium is glass fiber having associated therewith suitable synthetic resin bonding agents utilized to retain the shape and compactness of the masses of glass fiber utilized.

Another object of this invention is to provide an improved method for forming filter elements wherein the manner of construction permits ease in the controlling of the density or densities of component parts of the filter element.

Another object of this invention is to provide an improved method of making filter elements wherein successive layers of glass fiber are wrapped upon a mandrel and wherein successive layers are differently treated to vary the filtering properties so that the compound filter is capable of functioning as above set forth.

More specifically, it is an object of the present invention to provide an improved method of making tubular filter elements having successive layers possessing different filtering characteristics, wherein the successive layers are formed individually and rigidified to retain their particular filtering characteristics before the next succeeding layer is applied.

The above object deals with the principle of utilizing a combination of fibrous material and a curable bonding agent wherein the successive layers are subjected to a curing step to rigidify the layers before application of the next layer, thereby preserving the desired filtering characteristic of each individual layer. Thus, successive layers may be subjected to different degrees of compression to vary their densities without affecting those layers already formed.

A further object of this invention is to provide an improved form of filter element characterized by having increasing density in the direction of the flow of liquid to be filtered therethrough whereby solid impurities will be removed from the liquid being filtered at random in the initial stages of the passage of liquid therethrough to the exclusion of confining such removal to any prescribed or predictable zone and wherein the ultimate filtering action will be such as to effectively remove solid impurities down to very small particle size and also to effect the breaking up of emulsions for the removal of water in the liquid.

FIG. 4 is a perspective view of a glass fiber batt and illustrating diagrammatically thereon the manner in which certain elements of a modified form of construction are formed therefrom.

FIG. 5 is a perspective view showing the component part of a filter element constructed in accordance with a modified form of the invention after having been cut from the batt shown in FIG. 4.

FIG. 6 is an enlarged end view of the batt portion shown in FIG. 5.

FIG. 7 is a view similar to FIG. 1 but showing the modified form of filter having as a component part thereof the batt portion as illustrated in FIGS. 4–6.

FIG. 8 is a view similar to FIGS. 1 and 7 but showing a still further modified form of the invention.

FIG. 9 is an enlarged sectional view showing a portion of the filter element in accordance with FIG. 8.

FIG. 10 is a perspective view showing a portion of a filter element constructed in accordance with the present invention and showing the manner in which water downwardly travels on the filter body in opposition to the flow of the filtered liquid.

Figure 1:
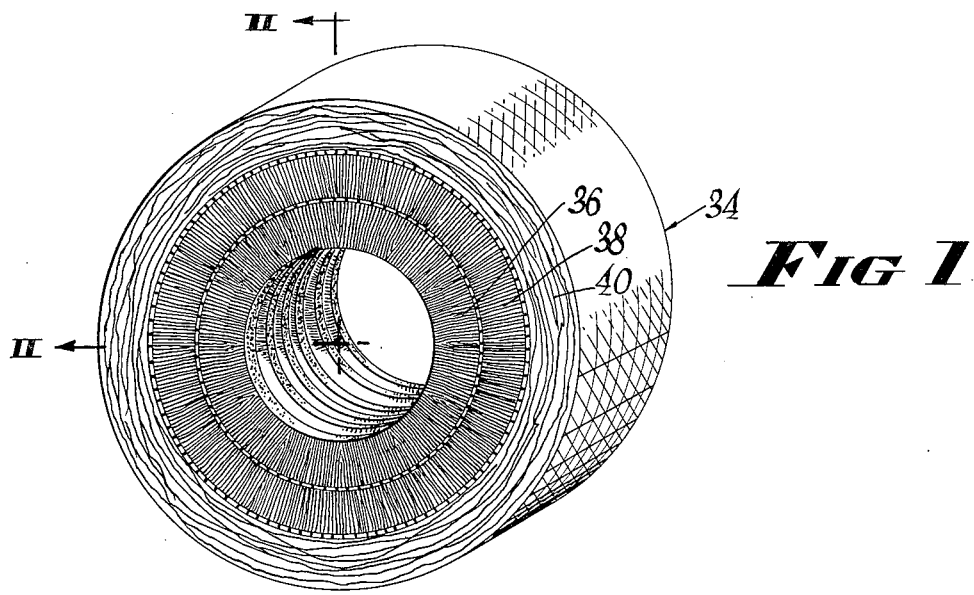
FIG. 1 is a perspective view showing one form of filter element constructed in accordance with the present invention.

Referring now more particularly to FIG. 7 the filter element shown therein is indicated generally by the reference character 10 and will be seen to consist of two component parts, the inner tubular or cylindrical portion 12 and the outer cylindrical portion 14. The inner of these portions 12 may be conveniently formed from a batt 16 as is illustrated in FIG. 4. In this figure, the batt 16 will be seen to consist of a plurality of generally parallel fibers which run longitudinally through the batt. One end 18 of the batt is cut square and has applied thereon a thin coating of bonding material 20 to join the fiber ends together. Subsequently, the batt is severed along the line 22 so as to provide the component part 12 of the filter element as is shown in FIG. 5. In this way it will be appreciated that the ends of the fibers which are joined by the bonding agent 20 are fixed relatively to each other whereas the opposite ends are free to move relative to each other. This is illustrated clearly in FIG. 6 of the drawing.

The component part 12 as it appears in FIG. 5 of the drawing is then wrapped onto a suitable mandrel so as to be in the cylindrical form thereof as it ultimately appears in the filter element 10 as shown in FIG. 7. Thereafter, a spiral overwrap of fiber material characterized by having its fibers running circumferentially is made to form the component part 14 of the filter element shown in FIG. 7. The material forming the component portion 14 of the filter element is similar to the batt shown in FIG. 4. However, in the case of component part 14, the batt is impregnated with bonding agent which is partially cured to give some degree of substance or weight sustaining property to the batt. When the fiber overwrap to form component part 14 is made on the component part 12 which is disposed on the associated mandrel, the portion 14 is subjected to a predetermined amount of compression and while in this condition, the bonding agent impregnated therein is cured to hold the degree of compression to which the component part 14 is subjected during the curing. By varying the degree of compression imparted to the component part 14 before it is cured, the density of this component part may be changed at will to suit varying conditions of filtering to which the filter element will be put.

Likewise, the filtering action can also be varied, in addition to the density variation, by means of the size of the elements or fibers of the batt from which the overwrap 14 is made. The same thing is true with regard to the inner portion 12 of the filter element. That is to say, the filter portion 12 can be varied as to its density by initial compaction of the batt 16 and/or the size of the elements or fibers of the portion 12 may be varied to tailor the filtering properties of this component part of the filter element to those desired for the particular application of the filter.

It is preferred that the batt material from which the component parts 14 are formed, is composed of glass fiber since it has been found that this material is admirably suited for the purposes intended. Any suitable synthetic resin or the like bonding agent may be associated with such batt, and will be readily appreciated by those skilled in the glass fiber art.

It will be appreciated, however, that the bonding agent is of not such nature as will render the same impervious when cured but, rather the same will harden to a pervious mass when finally cured.

In any event, it will be readily appreciated that the inner component 12 is less dense and relatively more porous than the outer component 14 since the flow of liquid through this filter agent element is intended to be from the inside out, that is, substantially radially outwardly from the central opening of the filter element. It will further be noted that the inner component 12 as well as the outer component 14 are of substantial radial depth so that when the dirty liquid first encounters the inner surface of the component 12, the relatively porous characteristic thereof will permit a deep penetration of the fluid and of the impurities of solid character carried thereby into the component 12 wherein they will be filtered out to a major extent. It will be noted, that since the fibers of the component 12 are free, there will be no predictable zone or surface at which the largest particles of the foreign impurities will be filtered out as is the case with a paper or similar filter wherein the initial filtering action takes place right at the surface of the paper. Rather, the particles filtered out can actually relocate after having been filtered out from the body of the liquid passing therethrough the filter element and in any case there is no finite surface or zone or area at which the initial filtering action will take place which would represent means wherein the filter could become quickly clogged due to the presence of foreign material thereat. At the same time, it will be further noted that as the liquid being filtered passes deeper and deeper into the filtering element, particles of smaller size down to very small size will be filtered out. Thus, with a relatively great dept of the dense component 14 a point will be reached wherein substantially the only filtering action obtained is that of removing entrained moisture or moisture in the form of an emulsion. In regard to this latter, actual tests have borne out the fact that filters in accordance with the present invention are capable of breaking down water emulsion in the liquid being filtered so that the emulsion, being broken up, will permit the water to form into discrete droplets which may be easily trapped and removed from the main body of the liquid being filtered. This is illustrated best in FIG. 10 of the drawings wherein it will be noted that the filter element indicated generally therein by reference 30 and which may be in accordance with any one of the principles of this invention, shows droplets of water 32 on the outer surface thereof running downwardly thereon for ultimate disposition in a trap or sump associated with the housing within which the filter element 30 is contained. Actual observation of this effect shows that the moisture tends to "weep" from the filter element and to run by gravity downwardly thereon for ultimate disposition in any suitable trap or sump therefor. For this purpose it will be readily appreciated that the filter element, to accomplish this end need not necessarily be vertically disposed as is shown in FIG. 10 but it will also be appreciated that the trap or sump must be at the lowest point of elevation in the housing containing the filter element.

Figure 2:
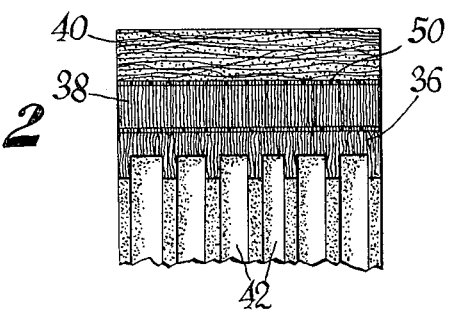
FIG. 2 is an enlarged longitudinal section taken substantially along the plane of section line 2—2 in FIG. 1 and showing the component parts of the filter elements.
Figure 3:
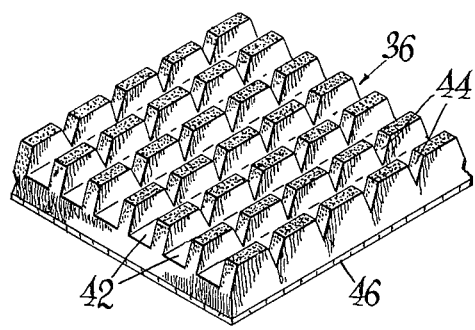
FIG. 3 is a perspective view of a portion of the filter element of a portion of the element shown in FIG. 2 but illustrating such portion in a flat condition, before being formed into cylindrical figuration.

Referring now more particularly to FIGS. 1–3, another form of the filter element in accordance with the present invention will be seen. In FIG. 1 the filter element is indicated generally by the reference character 34 and will be seen to consist of three separate component parts, 36, 38 and 40. The filter element component 38 in FIG. 1 is formed identically with the filter element 12 described in conjunction with FIG. 7. Likewise, the innermost element 36 in FIG. 1 is formed similarly to the component 38 excepting that this filter element component 36 is characterized by having circumferentially extending grooves 42 as well as longitudinally or axially extending V-shaped slits or notches 44 substantially as shown in FIGS. 2 and 3 of the drawing. That is to say, when the innermost element 36 is formed, the free ends of the fibers are transversely notched to provide the ultimately circumferentially extending grooves 42 and are also provided with the V-shaped notches 44 substantially as is shown in FIG. 3 and while the component 36 is in the flat condition as shown. In this figure it will also be clear that the bonding agent 46 serves to secure the fibers together at one end while leaving the opposite ends free.

The purpose of the circumferentially extending grooves or notches 42 is to provide a greater surface area for the filtering component 36 whereas the axially extending notches 44 or grooves are provided to prevent the fibers from compressing on the innermost surface of the component 36. Thus, a more uniform density radially of the element 36 is effected. It will be appreciated that notches 44 close up when the component 36 is wrapped upon its associated mandrel, this effect being observable both in FIGS. 1 and 2.

As is also shown clearly in FIG. 2, the layer of bonding agent for the intermediate component 38 is illustrated by reference character 50, this component being the same in all other respects to the component 12 shown in FIG. 5 of the drawings. The outermost component 40 is formed similarly to the overwrap 14 described in connection with FIG. 7 of the drawings.

The three components 36, 38 and 40, it will be appreciated, are of varying density throughout. That is to say, the innermost component 36 will be the least dense and consequently the most porous, the component 38 will be of intermediate porosity or density and the outer wrap or overwrap component 40 is of the greatest density. This construction, of course, gives a greater variation or degree of density and porosity radially through the filter element as may be desirable or required for more complex or rigorous conditions of filtering.

Referring now more particularly to FIGS. 8 and 9 wherein a further modification of the present invention as shown, the filter cartridge is indicated therein by reference character 60 and will be seen to include three components 62, 64 and 66. In this particular type of element, the flow of the liquid being filtered is radially inwardly and the take off for the filtered liquid is through the central opening of the element. The two components 62 and 64 are formed similarly to the overwrap or outer components 14 and 40 of FIGS. 7 and 1, respectively, but it will be appreciated that the innermost component 62 is compressed to the greatest degree and cured in that condition so as to represent the densest component part of the element whereas the component 64 is compressed to a lesser degree and represents intermediate density or porosity.

The outer component 66 is compressed to only a slight degree and is thus relatively porous, that is, it is the least dense of the three components 62, 64 and 66. The component 66 is likewise formed in the manner of the two components 64 and 62 with the exception that its outer surface is provided with a series of circumferentially extending grooves at 68 to increase the effective surface area of this filter element component.

In any event, in the several embodiments as of the invention as shown and described herein, it will be appreciated that of paramount importance with respect thereto is the provision of a series of relatively deep filtering element components which are variable as to their density when manufactured so as to suit the needs of a particular filtering problem. It should also be noted that the first filter element component upon which the fluid being filtered impinges is characterized by such great porosity that the liquid may penetrate deeply thereinto without filtering out the largest particle of impurities at any one particular or predeterminable zone or surface thereof. This obviates premature clogging of the filter element such as is occasioned by filter elements utilizing primarily a surface filtering action.

I claim:

1. The method of making filter components which comprises:
    (a) resin coating a batt of fiber glass material on one surface thereof,
    (b) partially curing such resin coating to render the fibers of the batt loosely adhered to each other at said surface and free of adherence in the remainder of the batt,
    (c) forming such batt into tubular shape to form a first inner component with at least a substantial portion of the fibers extending generally radially inwardly from said resin coated surface,
    (d) further curing said resin coating to hold the tubular shape of the inner component,
    (e) applying a second component onto the inner component in which the second component is a pliable and compressible combination of fiber glass material having fibers disposed transverse in direction to the fibers in the first component,
    (f) applying a curable bonding agent,
    (g) compressing said second component to effect a desired density thereof, and
    (h) curing the bonding agent in the second component while the same is in compressed state so as to maintain the desired density thereof.

2. The method of making filter components as set forth in claim 1 wherein the second component is compressed to provide a greater density than the density of the first component.

3. The method of making filter components as set forth in claim 1 wherein an additional tubular filter element is formed intermediate the first component and the second component.

References Cited by the Examiner
UNITED STATES PATENTS

| | | | |
|---|---|---|---|
| 1,357,411 | 11/20 | Mosheim | 156—72 X |
| 1,611,907 | 12/26 | Hall. | |
| 2,039,312 | 5/36 | Goldman | 210—508 X |
| 2,386,684 | 10/45 | Hermanson | 210—489 |
| 2,395,301 | 2/46 | Sloan. | |
| 2,584,387 | 2/52 | Harvuot | 210—494 X |
| 2,701,062 | 2/55 | Robinson. | |
| 2,782,933 | 2/57 | Monsarrat | 210—496 X |
| 2,784,630 | 3/57 | Koprow | 156—72 X |
| 2,883,345 | 4/59 | Taylor. | |
| 2,911,101 | 11/59 | Robinson | 210—489 X |
| 2,919,030 | 12/59 | Grant | 210—496 X |
| 3,012,923 | 12/61 | Slayter. | |
| 3,061,107 | 10/62 | Taylor | 210—496 X |

REUBEN FRIEDMAN, *Primary Examiner.*

HERBERT L. MARTIN, ALEXANDER WYMAN, *Examiners.*